United States Patent
Wamhof et al.

(10) Patent No.: US 7,155,971 B2
(45) Date of Patent: Jan. 2, 2007

(54) METHOD AND DEVICE FOR DETERMINING THE VOLUMETRIC FLOW RATE OF MILK FLOWING DURING A MILKING PROCESS

(75) Inventors: Heiner Wamhof, Bad Iburg (DE); Marek Krasutzki, Telgte (DE); Peter Kaever, Oelde (DE); Jan-Hermann Reurik, Gölenkamp (DE)

(73) Assignee: WestfaliaSurge Gmbh, Bonen (DE)

( * ) Notice: Subject to any disclaimer, the term of this patent is extended or adjusted under 35 U.S.C. 154(b) by 0 days.

(21) Appl. No.: 10/495,544

(22) PCT Filed: Nov. 18, 2002

(86) PCT No.: PCT/EP02/12901

§ 371 (c)(1),
(2), (4) Date: Oct. 8, 2004

(87) PCT Pub. No.: WO03/042637

PCT Pub. Date: May 22, 2003

(65) Prior Publication Data

US 2005/0034518 A1  Feb. 17, 2005

(30) Foreign Application Priority Data

Nov. 16, 2001  (DE) ................................ 101 56 450
Jul. 22, 2002  (DE) ................................ 102 33 312

(51) Int. Cl.
*G01F 1/00* (2006.01)

(52) U.S. Cl. ...................................................... 73/227

(58) Field of Classification Search ............. 73/861.29, 73/861.18, 861.27, 861.28, 861.04; 324/204; 356/28

See application file for complete search history.

(56) References Cited

U.S. PATENT DOCUMENTS

| 4,208,906 | A | * | 6/1980 | Roberts, Jr. .............. 73/152.32 |
| 5,083,459 | A | | 1/1992 | Lind et al. |
| 5,503,026 | A | | 4/1996 | Bohm et al. |
| 5,546,813 | A | * | 8/1996 | Hastings et al. ......... 73/861.29 |
| 6,369,881 | B1 | * | 4/2002 | Wang .......................... 356/28 |
| 6,650,108 | B1 | * | 11/2003 | Carlson et al. ............. 324/204 |
| 6,655,221 | B1 | * | 12/2003 | Aspelund et al. ........ 73/861.04 |
| 2001/0039838 | A1 | | 11/2001 | van den Berg |

FOREIGN PATENT DOCUMENTS

| DE | 37 37 607 A1 | 5/1989 |
| DE | 31 01 302 C2 | 2/1990 |
| DE | 41 10 146 A1 | 10/1992 |
| DE | 41 10 146 C2 | 2/1993 |

(Continued)

*Primary Examiner*—Jewel Thompson
(74) *Attorney, Agent, or Firm*—Smith Law Office

(57) ABSTRACT

The invention relates to a method and device for determining the volumetric flow rate of milk flowing during a milking process. A cross-sectional area (Ai) of the milk flow (2) is determined at a first measuring point (3) by means of a sensor (4) which is arranged outside the flowing milk. The time (ti) required by the milk flow (2) with the determined cross-sectional are (Ai), to go from the first measuring point (3) to a second measuring point (5) which is provided downstream from the first measuring point, is measured. The flow speed (vi) is derived from the measured time (ti) and the known distance (s) between the first and second measuring points (3, 5). The volumetric flow rate (V(t)) is determined on the basis of the determined cross-sectional area (Ai) and the flow speed (vi).

27 Claims, 6 Drawing Sheets

FOREIGN PATENT DOCUMENTS

| | | |
|---|---:|---|
| DE | 41 34 549 A1 | 4/1993 |
| DE | G 93 16 008.9 | 10/1993 |
| DE | 198 43 806 A1 | 3/2000 |
| EP | 0 733 884 A1 | 9/1996 |
| EP | 0 536 080 B1 | 1/1998 |
| EP | 0 846 934 A1 | 6/1998 |
| EP | 0 315 201 A2 | 11/1998 |
| WO | WO 93/12413 | 6/1993 |
| WO | WO 95/17650 | 6/1995 |

* cited by examiner

METHOD AND DEVICE FOR DETERMINING THE VOLUMETRIC FLOW RATE OF MILK FLOWING DURING A MILKING PROCESS

The object of the invention refers to a method as well as to a device for the determination of the volumetric flow rate of milk flowing during a milking process.

Milking of an animal, especially of a cow, is a complex process. The duration of a milking process is individual for each animal. Even in the case of individual animals, the time-span within which the milking process is carried out may vary greatly since this is also dependent on the lactation status of the animal. It has been found that the milk flow is a relevant quantity which can be utilized for triggering the progress of other processes, for example, for the control and adjustment of devices within a milking operation. During the milking process, switching off, post-milking and/or other devices are used in order to perform the milking process economically on the one hand and adjusted to the animal on the other hand. A prerequisite for this is as accurate as possible knowledge of the actual preferably instantaneous milk flow rate.

With increasing mechanization of dairy cattle husbandry, there is now increased interest in the determination of the individual amounts of milk per animal as well as of the amount of milk given by a herd. Based on knowing the amounts of milk given during the individual milking processes or over certain periods, improved animal husbandry, as well as improved herd management becomes possible. The fundamental problems in the determination of the volumetric flow rate or of the mass flow rate of milk should be regarded essentially in the fact that the amount of volumetric or mass flow rate pulsates so that the flow is not uniform.

During the milking process, the milk is not present as a homogenous phase, but it has many phases. It consists of a liquid phase and a foam phase, where the foam phase alone can have different consistencies.

In order to determine the volume or the mass of the milked milk, different concepts have been developed. The determination of the weight of the milked milk by volumetric measurement is of special importance. The equipment provided for this has a measuring chamber in which either the weight of the contents is determined with a tipping cart or the volume is determined with a floater or sensor electrodes. Equipment in which the subdivision of the milk flow is done in small portions, the volume or weight of which is determined, the inflow to the measuring chamber is always open and only a valve controls the emptying.

Furthermore, devices are known with the aid of which the mass of milk has to be determined during free flow-through. These devices use ultrasound or infrared sensors and narrow the cross-section of the line greatly and/or segment the milk flow in a multiple manner. A partial stream can be branched off for the measurement. Then the problem of proportional separation of a partial flow with higher accuracy occurs, because the accuracy of the flow-through determination depends on the accuracy of the separation of the partial flow. Measuring equipment available so far based on mho measurement has low accuracy. There is also equipment which determines the fluid flow through binary evaluation of the sensor signal. The accuracy of the equipment that operates according to the second method depends on external parameters, such as mounting, dynamics of the milk flow, pressure, and other parameters.

In the case of equipment which operates in flow-through and in which the cross-section of the line is narrowed or the milk flow is multiply segmented, there is increased danger of contamination and poor cleaning possibilities. For example, with the flow meter described in U.S. Pat. No. 5,083,459, although a transition resistance measurement is performed, the operation is carried out with a measuring chamber in which the milk stagnates, so that the cleaning of the equipment is expensive.

The problem in the determination of the weight of the milk is that milk is a highly foaming fluid, so that there is a relatively high measurement uncertainty with regard to the weight of the foaming milk. This problem is known and is described in EP 0 315 201 A2.

In order to solve this problem, according to EP 0 315 201 A2, it is proposed to determine the entire profile of the foaming liquid, and in this way it is taken into consideration that the specific gravity of the liquid-air mixture changes as a function of height. In order to measure the specific gravity of the foaming liquid at various height levels, a reference value is measured on a measuring section containing essentially completely degassed liquid. Depending on if a corresponding measured value measured in air is greater or smaller than the reference value obtained in this reference section, for each height level, a relative number is formed corresponding to the ratio of the reference value and measured value at this height level, or the inverse of the ratio. Optionally, corresponding to a predetermined calibration, a corrected ratio can be formed which is equal to one for degassed liquid and is essentially zero for air. Each ratio is then multiplied with the value of the specific gravity of the degassed fluid. The result of this multiplication yields the specific gravity of the foaming liquid. In order to determine the weight of a foaming liquid, the volumes of the individual phases are determined and then these volumes are multiplied with the specific gravity of the foaming liquid.

The problem of the determination of the volumetric flow rate has also been described already in DE 41 10 146 A1. According to this publication, a method is described for the measurement of the milk flow during intermittent transport in the form of milk plugs of the milked milk through at least one ascending pipe section. Here a value corresponding to the weight of each milk plug is determined with consideration of a predetermined plug speed by scanning the time length of each milk plug inside the ascending pipe at a distance from the inside wall of the ascending pipe. From this, by time averaging of successive milk plugs, a mean milk flow value is formed. A prerequisite for this procedure is that the milk transport takes place in the form of milk plugs in the ascending pipe.

During the milking process, the milk does not flow in the form of a continuum, but rather in the form of milk plugs. A method is known from DE 41 10 146 A1 for the measurement of the milk flow in which the removal occurs in the form of milk plugs intermittently. The removal of the milked milk occurs through at least one ascending pipe section. For this purpose, it is proposed that a value corresponding to the weight of each milk plug be determined by scanning the length of the milk plug inside the ascending pipe section at a distance from the inside wall of the ascending pipe and to form a mean milk flow value by time averaging over the successive milk plugs. This procedure is based on the consideration that by suitable measurement of the milk plug, a conclusion can be drawn about the weight contained in a milk plug, and then from that again a conclusion can be drawn regarding the milk flow. This is based on the assumption that the milk plug as such is homogeneous.

In the milk stands used today with deeper-lying milk lines and low vacuum level, it is not always ensured that the transport occurs in the form of milk plugs. This is necessary for the functioning of the method described in DE 41 10 146 A1. The ascending pipe sections in milking installations are disadvantageous due to the high vacuum loss as well as from the point of view of the remaining residual amount of milk. Moreover, milk is a food, so that certain minimum hygienic requirements must be fulfilled. This presumes that the cleaning of the components of the milking system can be carried out safely and reliably. In the device for the measurement of a corresponding value of the weight of a milk plug during the intermediate transporting of the milk in the form of milk plugs according to DE 41 10 146 A1, sensors are provided at intervals in the ascending pipe away from its inside wall. This can lead to increased liability to contamination. Therefore, cleaning is not without problems. Moreover, the line cross-section of the ascending pipe is changed by these sensors.

Based on this, the task of the present invention is to create a method as well as a device through which determination of the volumetric flow rate becomes possible independently of the type of transportation of the milk.

According to the invention, this task is solved by a method with the characteristics of claim 1 and with a device with the characteristics of claim 13. Advantageous further developments and embodiments are the objects of the particular subclaims.

The method according to the invention for the determination of a volumetric flow rate of the milk flowing during a milking process is characterized by the fact that, at a first measuring point, a cross-sectional area of the flow cross-section of the milk flow or a quantity proportional to the cross-sectional area in determined. In this way information is obtained about the cross-sectional area in the line occupied by the milk flow. The cross-sectional area is an area which is essentially perpendicular to the discharging direction. In another step, the time or a characteristic, measured for time is determined which is needed for the milk flow with the determined cross-sectional area to arrive from the first measuring point to a second measuring point which lies downstream from the first measuring point. The distance between the first and second measuring points is known so that from this the actual flow speed can be determined. The determination of the volumetric flow rate is carried out based on the determined cross-sectional area and flow speed.

Preferably, the device can be designed so that the cleaning of the components of the milking system through which the milk flows is not influenced or is influenced only to a slight degree. Preferably, the volumetric flow rate is determined in a line with a predetermined geometry.

With the aid of the fundamental methodology according to the invention, there is a possibility of determining the volumetric flow rate in the milk line without having to know the form of the milk transport, for example, in the plug form. The method can be carried out even with the milk stands used today with a deeper-lying milk line and low vacuum level.

The determination of the flow speed of the milk flow can be refined with the aid of modeling of the flow dynamics of the milk flow, for example, with a differential equation. Especially, hydrodynamic laws and a special design of the milk path can be involved in the determination of the flow speed. These can also be used for the determination of the cross-sectional area in order to introduce the dependence of the cross-sectional area of the milk flow at the measuring point into the measuring equation. Especially the milk path can be designed in such a way that determination of the speed is favored.

When knowing the volumetric flow rate as a function of time, according to an additional proposal, a total volumetric flow rate can be determined by integration of the volumetric flow rate over time.

A quantity proportional to the cross-sectional area can be formed by producing the ratio of the cross-sectional area and a free-flow cross-section of the line. The quantity can assume two extreme values, namely 0 and 1. If the quantity is equal to zero, then no milk flow exists in the milk line. If the quantity corresponds to the value 1, or if this value lies near 1, then complete or almost complete filling of the line by the milk flow exists. In the case of such an almost completely-filled line, the speed can be interpolated in order to obtain a mean speed of the milk flow under these conditions. Here the interpolation extends preferably from the beginning of the milk section of the almost completely-filled line to its end. Thus, especially a value of the speed can be assigned even for the so-called milk plugs.

The determination of the time required by a disk of milk flow to flow from one measuring point to another measuring point, represents an essential quantity for the determination of the milk flow. As a method, it is proposed here to obtain this information from a combination between the measured values at the two measuring points.

For further improvement of the determination of the flow speed, it is proposed that downstream from the second measuring point at least one additional measuring point be provided. By using a larger number of measuring points, with the aid of an estimator based on the weighted least squares, the speed can also be determined, especially if the underlying flow conditions are known. The evaluation of the sensor data is done with the aid of Kalman filtering in post-processing. All data and observations flow simultaneously into a Kalman filter for the purpose of optimal estimation of the state of the system. The Kalman filter, as a recursive estimating algorithm according to the method of least squares, takes into consideration a priori knowledge of the dynamic behavior of the milk flow or of the milking system. In addition to observation equations, therefore, the Kalman filter also uses system equations which describe the dynamic behavior of the system. Here the prediction of a new state vector from the initial state or precursor state takes place. The predicted state vector is then corrected with the aid of observations carried out at a point in time. This correction is determined with a matrix which is obtained from the covariance matrices of systems and measurement noises. The matrix determines if the estimate of the state vector should primarily be done from the prediction or based on observations.

When performing the method with less powerful processors, the determination of the speed can also be done through forming correlation through time series of the various sensor signals. In a special even further simplified embodiment, the extraction of certain characteristics is provided in the signal stream of the sensors. The speed is obtained simply from a time assignment of the characteristics of the sensory signals streams. As characteristics, for example, especially high or especially low sensory values can be found especially in combination with high positive or high negative time changes or these values.

In order not to influence the flow by sensors and in order to achieve as simple cleaning of the line and other components of the milking system as possible, contactless measurement is proposed. Preferred here is the performance of the method with sensors which determine the conductivity of the milk. Especially, it is proposed that the conductivity of the milk be measured at least at one measuring point using a ring electrode. Rod electrodes are another preferred embodiment. Alternatively, or additionally, an optical detection of the milk flow can be performed.

The determination of the speed of the milk flow can also be determined with the aid of verification of irregular local inhomogeneities which move with the speed of the milk flow. The inhomogeneities can be, for example, gas bubbles which are enclosed in the milk flow.

If several measuring points are provided, then, in order to increase the accuracy of the speed determination, switching between different measuring points may be advantageous. When the measuring points lie close together, then filtering through several measuring points can be performed in order to improve the signal/noise behavior of the cross-section of the line that is covered with milk. In order to simplify the sensing of the milk flow, the cross-section of the path assumed by the milk should be kept as constant as possible from the point of view of construction.

The device according to the invention for the determination of a volumetric flow rate during a milking process of milk flowing in a line with predetermined geometry is characterized by the fact that a first measuring point with at least one sensor arranged outside the flowing milk as well as a second measuring point arranged downstream with at least one sensor arranged outside the flowing milk are provided. The signals produced by the sensors are evaluated in an evaluation unit. By designing the device in this way, the flow cross-section of the line does not change, so that the danger of contamination of component protruding into the flow cross-section occurs [sic].

Alternatively to this, the milk line can be designed so that the milk flow is formed in a way that especially favors sensing by electrodes, especially here the utilization of the centrifugal acceleration by cyclones or cyclone-like milk-line sections or correspondingly curved sections of the milk line are conceived. The change of the shape of the cross-section to cross-sections which are no longer approximately round can also improve the performance of the measurement. Here, especially cross-sections are considered which are elliptical, rectangular, approximately triangular, or are formed as a parabolic section.

A preferred embodiment of the device is in which downstream of the two measuring points at least one additional measuring point with at least one sensor is provided. In this case, the device is preferably designed so that each sensor can be switched against any other one in order to achieve maximum yield of measured values.

Another preferred embodiment device is one in which the at least one sensor is a conductivity sensor. Especially, it is proposed that the sensor be designed in the form of a ring electrode. Preferably, the line between two conductivity sensors is formed from an electrically-insulating material so that the conductivity of the line has no influence on the measurement results.

Alternatively or additionally, at least one sensor can be provided which is a capacitive or inductive sensing element. The sensors can also be photodetectors.

According to yet another advantageous embodiment of the device, it is proposed that the evaluation unit have at least one Kalman filter.

Through the embodiment of the device according to the invention, it is achieved that the determination of the volumetric flow rate of the milk [is done] with an inexpensive sensory system. By evaluation of at least two measuring points, regarding the flow dynamics which can vary by different pressure relationships in the milking installation and which can also vary from milking place to milking place, a significantly more robust determination of the milk flow is achieved. This applies especially at high milk flows.

In a preferred further development of the method according to the invention for the determination of a volumetric flow rate of milk flowing during a milking process, a quantity characteristic for the capacitance of the milk is determined essentially at each sensing time point. A value for the capacitance can be derived from that. The characteristic quantity can characterize a capacitance for the flowing milk or a quantity which is proportional to the capacitance within a predetermined measurement volume. The characteristic quantity or the capacitance of the milk or a quantity proportional to the capacitance is compared with predetermined capacitances or predetermined quantities for the determination of the actual milk volume within the measurement volume. Furthermore, the speed of the milk flow is determined and the volumetric flow rate of the milk is determined from these data.

The characteristic capacitance quantity is a quantity which is characteristic for the capacitance of the milk in the measurement volume. The capacitance of the milk in the measurement volume can be derived from the characteristic capacitance quantity. The characteristic capacitance quantity can, for example, be proportional to the capacitance. Similarly, a quadratic, logarithmic, exponential, empirically determined or other relationship is also possible.

According to a further development, it is proposed that at each sensing time point a characteristic capacitance quantity of the flowing milk or a quantity proportional to the capacitance can be determined within a predetermined measurement volume. The characteristic capacitance or quantity proportional to the capacitance is compared with previously known quantities for the determination of the milk mass actually located within the measurement volume. Furthermore, a determination of the speed of the milk flow is carried out. The mass flow of the milk is determined from the data thus obtained.

By determining the characteristic capacitance quantity of the milk, it is avoided that conducting compounds are interpreted as milk, as in the case in the known methods, which operate according to the transition resistance principle. The capacitance determination is contactless.

The determination of an actual milk volume or of milk mass within the measurement volume is done by comparison of the derived capacitance or capacitance quantity with already known capacitances or capacitance quantities. Here, possible changes of the dielectric constant of the milk are taken into consideration.

The proposed method also has the advantage that a determination of the volumetric flow rate or of the mass flow of the milk is achieved, although the milk is not present only as a pure liquid phase, but as a mixture of liquid phase and at least one foam phase. The foam phase or the amount of foam phase enters into the dielectric constant of the milk and thus into the capacitance of the milk. The determination of the relationship between the milk volume or the mass of the milk and the capacitance, which should be provided for comparison purposes, is preferably done empirically. If a sufficiently large amount of data is available, then, for example, mathematical description of the relationship between the capacitance and the consistency of the milk with the volume or mass of the milk can be performed.

The measurement of the capacitance of the flowing milk is preferably performed at predetermined time intervals. In this way, the change of the volumetric flow rate or mass flow of the milk as a function of time as well as the change of the volumetric flow rate or mass flow rate during the milking process can be determined. Using the measured data, the measurement frequency can also be controlled, namely, the frequency of measurement is higher at high milk flows, for example. These data can also serve as control and/or adjustment quantities for further devices or process runs. Also, when the mass flow rate is below a certain value, then the post-milking process and furthermore the stripping process can be started.

Preferably, more samplings of a milking process are carried out when these are used for the determination of a total volumetric flow rate or a total mass flow rate. These data are especially of interest in the macroscopic consideration of the herd.

The determination of the speed is preferably done optically. For this purpose, for example, transmission and receiving elements are provided which are arranged at distances to one another.

According to a further advantageous embodiment of the method, it is proposed that the determination of the capacity be carried out at least at two locations at a distance and that the time delays of the signals belonging to the capacitances be used for the determination of the speed. Then, the characteristic capacitance quantity can be derived from these measurements.

If the measurement of the capacitance is carried at least at two locations at a distance from one another, according to an even further advantageous embodiment of the invention, it is proposed that the capacitance be determined at least at two different frequencies. Alternatively to the frequencies, additionally the determination of the capacitance at least at two different temperatures can also be performed. This conduction of the process has the advantage that even greater measurement reliability is obtained. This is especially the case in the determination of the capacitance at least at two different temperatures, because, as a result of this, the influence of the temperature on the capacitance can be considered and compensated for.

According to another inventive idea, a device is proposed for the determination of the mass flow rate of milk flowing during a milking process. The device has a measurement arrangement for the determination of a characteristic capacitance quantity. Furthermore, a device for the determination of the speed of the milk is provided. The data provided by the measuring devices are evaluated by an evaluation unit regarding relevant quantities with previously-known data. The device has a control unit which is connected to the evaluation unit and the measuring devices where the control unit controls the measuring device at predetermined time intervals so that sequential determination of the capacitance and the speed is performed.

The determination of the capacitance is preferably done with the aid of plates arranged at a distance from one another, which are preferably a component of the measuring device. The arrangement and the shape of the plates can be devised in another way. This is to be optimized by experimental technology. One can also consider here opposing metal surfaces around a circular cross-section.

The plates are preferably arranged in the flow path of the milk in such a way that the milk flows around them, at least partially. However, the plates can also be provided so that they are electrically insulated from the milk. Preferably, the plates are arranged parallel to one another.

According to yet another advantageous embodiment of the device, it is proposed that this have two measuring devices arranged one after another in the flow direction of the milk for the determination of the characteristic capacitance quantity and that these are connected to a correlation unit. The correlation unit will also permit the determination of the speed of the flowing milk.

The two measuring devices arranged one after another are operated preferably at different frequencies or at different temperatures.

Further advantages of and details of the method according to the invention and of the device according to the invention are explained with the aid of practical examples shown in the drawings without the object of the invention being limited to these practical examples.

The following are shown

FIG. 1 shows schematically a first practical example of a device for the determination of the volumetric flow rate of a milk flowing 2 with a predetermined geometry in a line 1 during a milking process.

Figure 1:
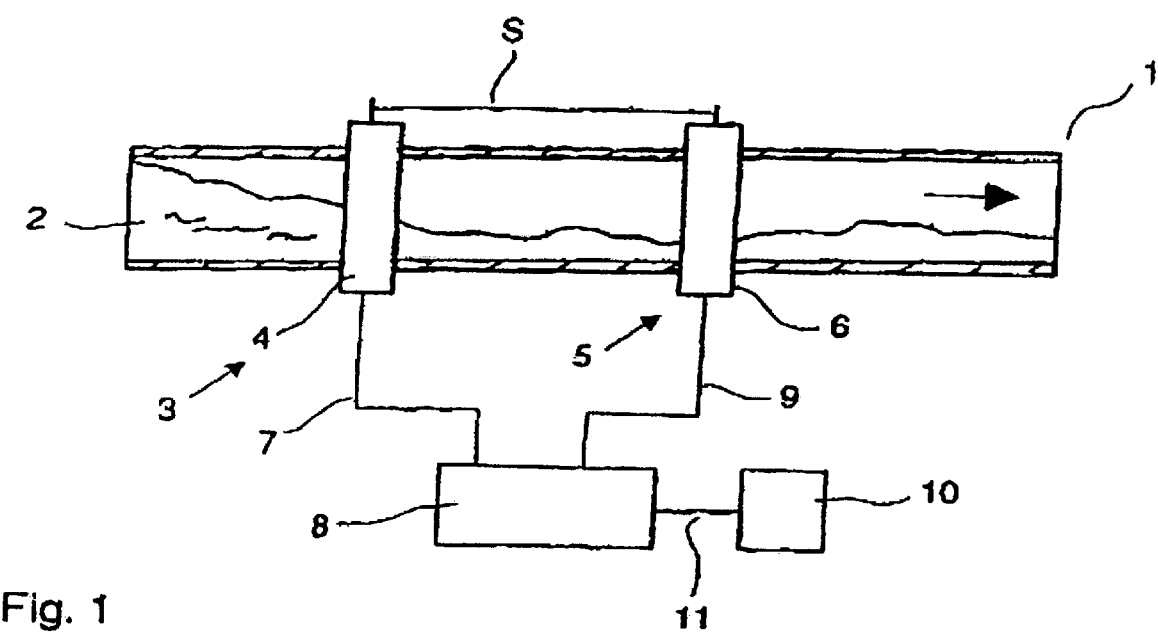
FIG. 1 is a schematic illustration of a first practical example of the device according to the invention.

The device has a first measurement point 3. This measurement point 3 contains at least one sensor 4 arranged outside the flowing milk. In the practical example shown, the sensor 4 is formed by a ring electrode which is arranged on the outside mantle of line 1.

Downstream from the first measurement point 3, a second measurement point 5 is provided at a distance s. The second measurement point 6 also has a sensor 6 which is designed in the form of a ring electrode. The ring electrode is arranged on the outside mantle of line 1. This sensor 4 is connected to the evaluation unit 8 by a signal line 7. This unit is also coupled to sensor 6 of the second measurement point 5 through signal line 9. For the output of the determined data, an output device 10 is provided in the evaluation unit 8 and it is connected to the evaluation unit 8 through a connecting line 11. The evaluation unit 8 can include a computer.

Figure 2:
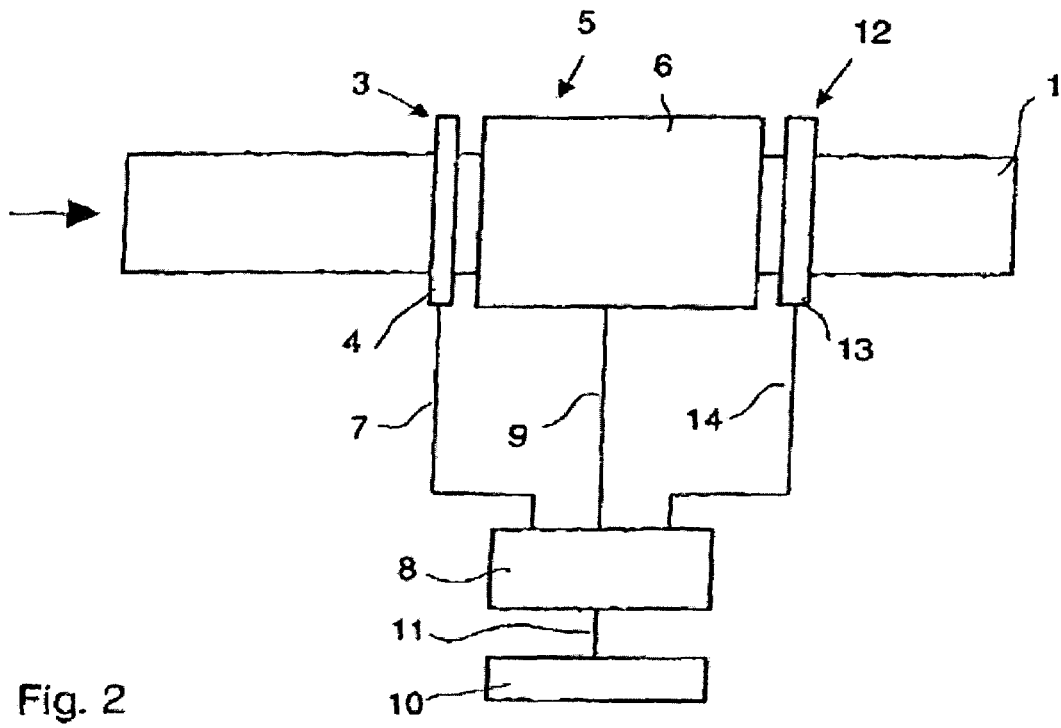
FIG. 2 is a schematic illustration of a second practical example of the device for the determination of a volumetric flow rate of a flowing milk and FIG. 3 shows the process schematically.

FIG. 2 shows a second embodiment of a device. The principle of the structure of the device according to FIG. 2 corresponds to the device according to FIG. 1, where downstream from the second measurement point 5, an additional measurement point 12 with sensor 13 is provided. The sensor 13 is connected to evaluation unit 8 via a signal line 14. The sensors are designed so that these can be switched against any other in order to achieve maximum yield of measured values. Sensor 6, which is designed in the form of a ring electrode, can be used as a common electrode, and the gap between measurements points 1, 2, and 2, 3 represent the sampling points.

Figure 3:
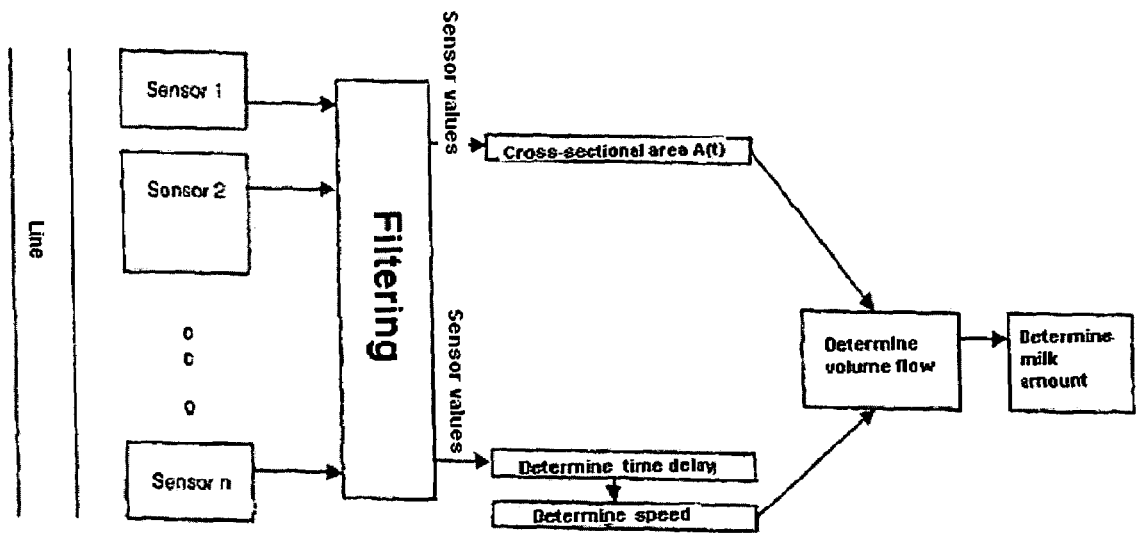

FIG. 3 shows schematically a process designed for the determination of a volumetric flow rate of milk flowing in a line with a predetermined geometry during a milking process.

The line in which the milk flows is shown schematically. Several sensors are coupled to the line, which determine the milk flow in the line. The signals of the individual sensors are subjected to filtering and optionally to amplification.

The corresponding sensor values are generated from the signals, and these are used for the determination of the cross-sectional area A(t). The cross-sectional area A(t) reflects the flow cross-section of the milk flow in the line.

In addition to the sensor values from which the cross-sectional areas of the flow cross-sections of the milk are determined, a time delay determination is carried out so that from these values the speed of the milk in the line can be determined.

Knowing the cross-sectional area as well as the flow velocity of the milk, a volumetric flow rate determination can be performed. By integration of the volumetric flow rate over time, the amount of milk or the total volume of the milk flowing in a predetermined time interval can be determined.

Figure 4:
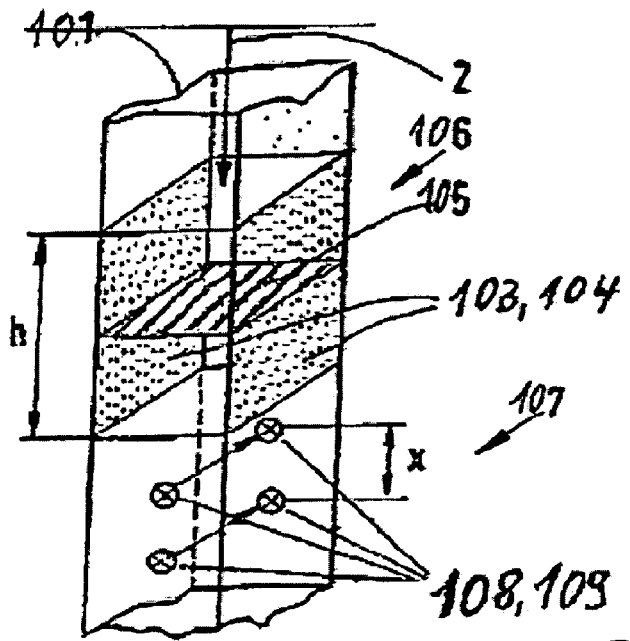
FIG. 4 is a third practical example of the measuring devices for the determination of capacitance and speed.

FIG. 4 shows schematically a third practical example of the measuring device for the determination of the capacitance and the speed of flowing milk.

The measurement devices are connected to a capacitor 101 through which the milk flows. The flow direction of the milk is indicated by arrow 102.

A measurement device is provided for determination of the capacitance of the flowing milk or of a quantity proportional to the capacitance. For this purpose, the measuring device 106 has two capacitor plates 103, 104 arranged at a distance to one another. Plates 103, 104 are arranged parallel to one another. They each have a height of h. The free-flow cross-section between plates 103, 104 is designated with reference number 105.

Behind the measurement device for the determination of the capacitance of the flowing milk, looking in the direction of flow of the milk, a measuring device 107 is provided for the determination of the speed of the milk. Device 107 includes two optical transmission and receiving elements 108, 109 arranged at a distance from one another. In the practical example shown, the transmission and receiving elements 108, 109 are arranged at a distance x from one another. The optical transmission and receiving elements can be photoelectric barriers (for example, infrared).

Figure 5:
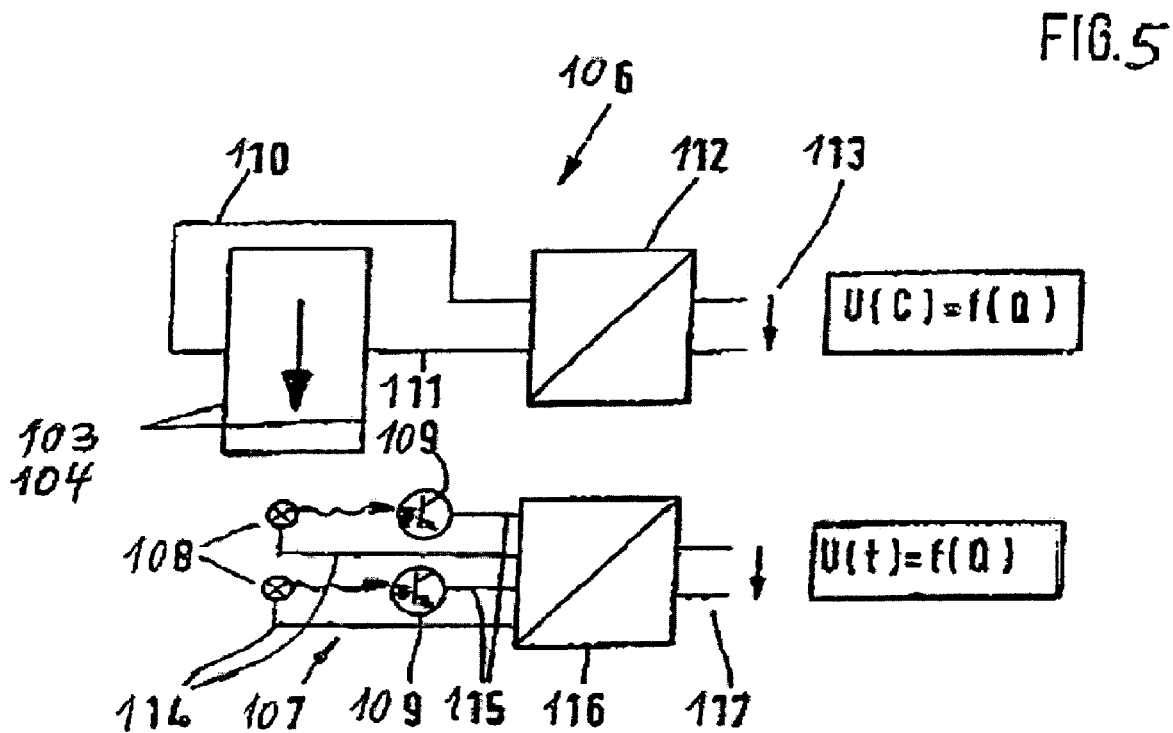
FIG. 5 is a schematic illustration of the circuit of the measuring devices for the determination of a capacitance and the speed.

FIG. 5 shows schematically a circuit diagram of the measurement devices according to FIG. 4. The measurement device 106 for the determination of the capacitance has capacitor plates 103, 104. Each of the capacitor plates 103, 104 is connected to a measurement amplifier 1 12 through a signal line 110, 111. The signal 113 of the measurement amplifiers yields the change of voltage of the capacitor as a function of the volumetric flow rate of the milk.

The measurement device 107 for the determination of the speed of the milk has a first and second pair of optical transmission and receiving elements 108, 109. The optical transmission elements 108 are each connected through two lines 114 with an amplifier 116. The optical receiving elements 109 are each connected through two lines 115 with the measurement amplifier 116. The measurement amplifier yields an output signal 117 which can be used for the determination of the speed of the milk.

Figure 6:
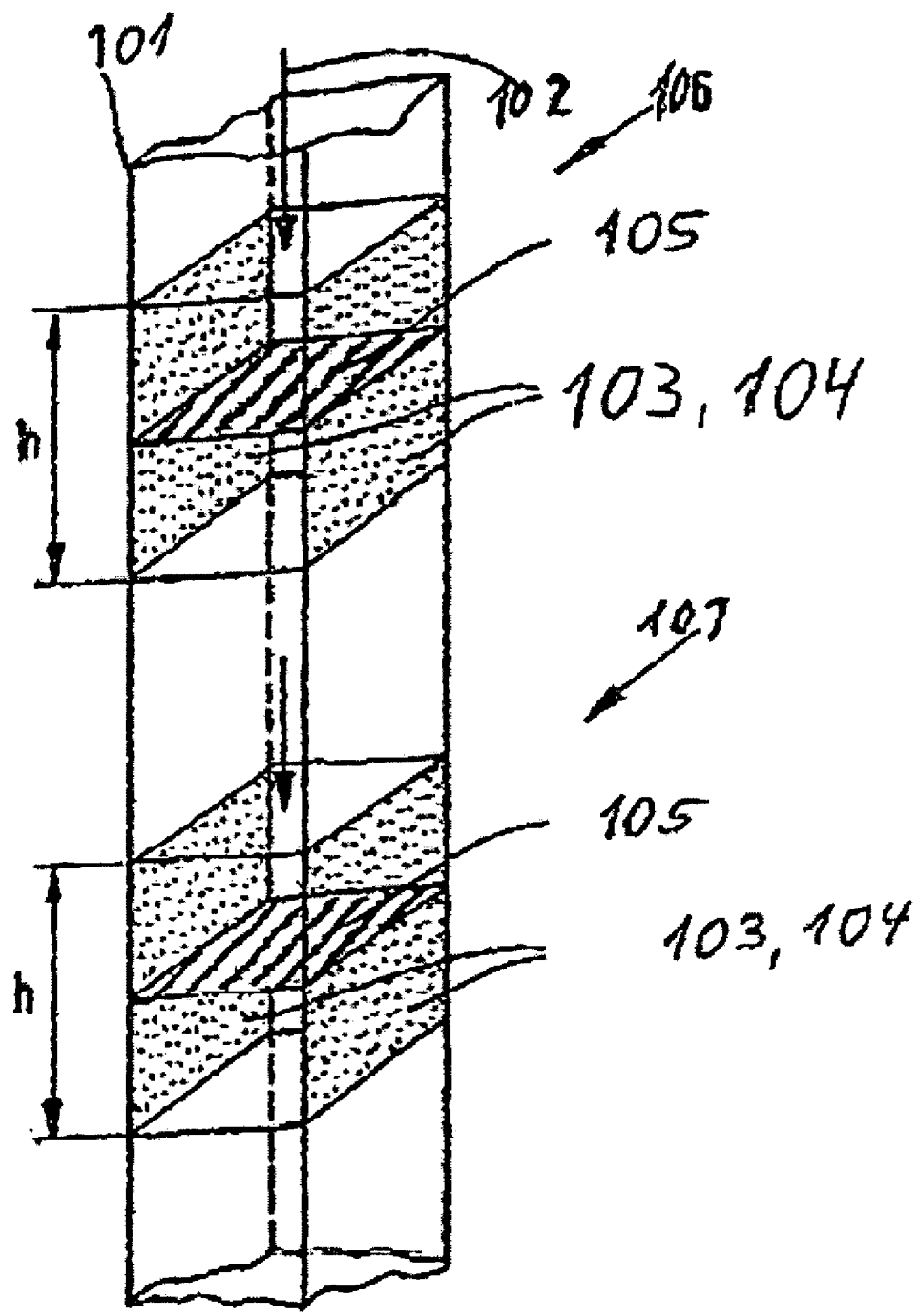
FIG. 6 is a fourth practical example of a device for the determination of a volumetric flow rate or mass flow rate.

FIG. 6 shows a fourth practical example of the measuring devices 106, 107 for the determination of the volumetric flow rate or mass flow rate and the speed of a milk flowing during a milking process.

Figure 10:
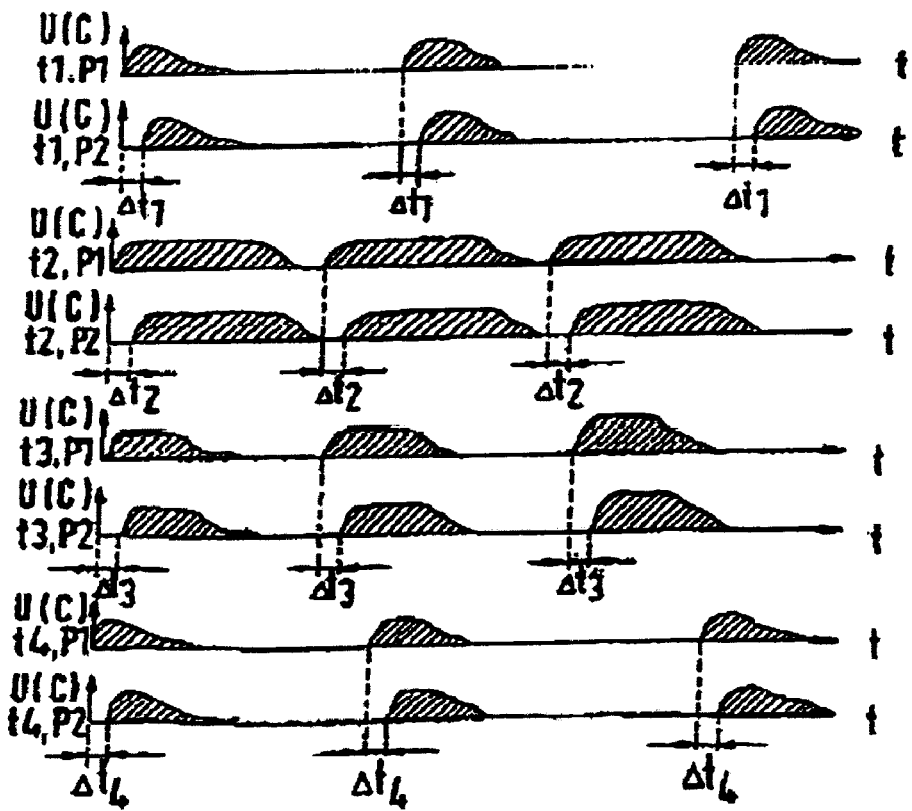
FIG. 10 shows the course of the voltage of the measuring device for the determination of the speed of the milk.

The structure of the measurement device 106 agrees with the structure of the measurement device 106 as shown in FIGS. 10 and respectively in FIG. 5.

Looking in the flow direction of the milk, the device for the determination of the capacitance is arranged after the device 107 for the determination of the speed of the milk. The structure of the measurement device 107 for the determination of the speed of the milk agrees with the structure of the measuring device 106 for the determination of capacitance. The measurement device 107 for the determination of the speed also has two parallel plates 103, 104 at a distance from one another.

Figure 7:
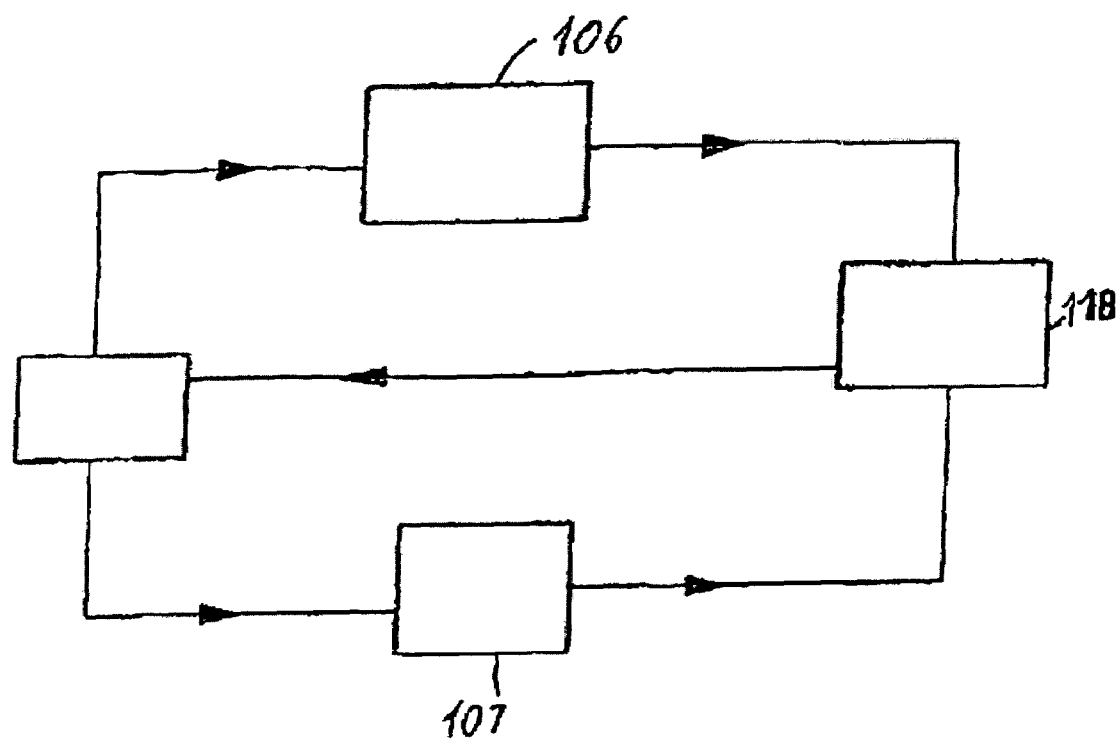
FIG. 7 is a schematic illustration of a device for the determination of a volumetric flow rate or mass flow rate of milk flowing during a milking process.
Figure 8:
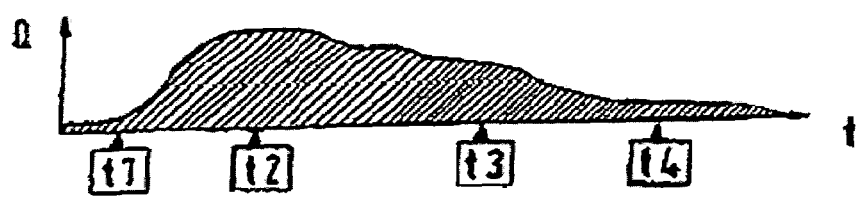
FIG. 8 is a schematic illustration in a diagram showing the course of the mass flow rate as a function of time.

FIG. 7 shows schematically the device for the determination of a mass flow rate of milk flowing during a milking process. The device has a measurement device 106 for the determination of a capacitance of the flowing milk or of a quantity proportional to the capacitance. Furthermore, a measurement device 107 is provided for the determination of the speed of the milk. The measurement device 106 and the measurement device 107 are connected with an evaluation unit 118. Furthermore, the device has a control unit 119 which is connected to the evaluation unit 118 and measurement unit 106, 107, where the control unit 119 triggers the measurement devices at predetermined time intervals.

The evaluation of the actual data, especially those of the measurement device for the determination of the capacitance is carried out in the evaluation unit 118 with regard to relevant quantities.

Figure 9:
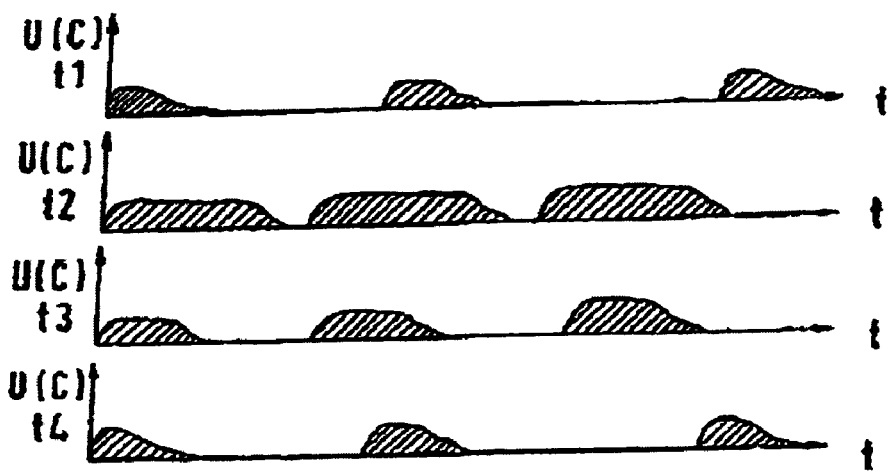
FIG. 9 is a schematic illustration of the course of the change of voltage over time.

At each scanning time, the capacitance of the flowing milk or a characteristic capacitance quantity is determined within a predetermined measurement volume. The measurement volume is predetermined by the free flow cross-section 105 and the height of plates 103, 104. The measurement device 106 yields at the predetermined scanning time points a voltage which is proportional to the capacitance of the milk. The time change of the voltage U (C) at certain scanning time points $t_k$ is shown in FIG. 9.

The evaluation of an appropriate capacitance or a quantity proportional to the capacitance is carried out in evaluation unit 118. Through this evaluation, the actually present milk volume within the measurement volume can be determined.

The speed of the milk is determined through the measuring device 107. Two measurement points are given by the transmission and receiving elements arranged at a distance from one another, each of which determine the beginning of a milk plug with a time delay $\Delta t$. From this delay $\Delta t$ the speed can be determined if the distance of the optical transmission and receiving elements is known. The course of the voltage signal of the measurement device for the determination of the speed is shown in FIG. 10, together with the corresponding delay times $\Delta t$ at certain scanning time points $t_k$.

Knowing the volume and the speed allows the determination of the volumetric flow rate of milk flowing during a milking process.

Knowing the capacitance of the milk or a quantity proportional to the capacitance, the determination of milk mass actually located within the measurement volume can be determined. Knowing the speed of the milk, the mass flow rate of the milk can be determined from the data thus obtained.

REFERENCE SYMBOL LIST

1 Line
2 Milk
3 First measurement point
4 Sensor
5 Second measurement point
6 Sensor
7 Signal line
8 Evaluation unit
9 Signal line
10 Output device
11 Connecting line
12 Third measurement point
13 Sensor
14 Signal line
101 Capacitor
102 Arrow
103 Plate
104 Plate
105 Free flow cross-section
106 Measurement device
107 Measurement device
108 Transmission and receiving device
109 Transmission and receiving device
110 Signal line
111 Signal line
112 Measurement amplifier
113 Measurement amplifier
114 Line
115 Line
116 Measurement amplifier
117 Output signal
118 Evaluation unit
119 Control unit

The invention claimed is:

1. Method for determining a volumetric flow rate of milk flowing through a milk line during a milking process comprising the steps of:
  a) determining at a first measurement point a cross-sectional area of a cross-section of a milk flow;
  b) measuring a time that the milk flow travels from the first measurement point to a second measurement point, the second measurement point being downstream from the first measurement point;
  c) calculating a flow velocity based on the measured time and a distance between the first and second measurement points;
  d) determining the volumetric flow rate from the cross-sectional area and the flow velocity; and
  e) determining a mean volumetric flow rate when a ratio between the cross-sectional area and a free flow cross-section of the milk line essentially corresponds to 1.

2. The method according to claim 1 further comprising the step of:
  repeating the volumetric flow rate measurements;
  storing the results of the volumetric flow rates; and
  determining a total volumetric flow rate by integration of the stored volumetric flow rates as a function of time.

3. The method according to claim 1 further comprising the step of:
  determining the flow velocity from at least one other measurement point, the other measurement point located downstream from the second measurement point.

4. The method according to claim 1, further comprising the step of:
  measuring the capacitance of the milk.

5. The method according to claim 1 further comprising the step of:
  measuring the conductivity of the milk using a ring electrode.

6. The method according to claim 1, further comprising the step of:
  optically determining the cross-sectional area of the milk flow.

7. The method according to claim 1, further comprising the step of:
  determining the flow velocity optically.

8. The method according to claim 1, further comprising the step of:
  deriving a mass flow rate of the milk flow.

9. The method according to claim 1, further comprising the step of:
  measuring the conductivity of the milk.

10. The method according to claim 1, further comprising the step of:
  measuring the inductance of the milk.

11. The method according to claim 1, wherein the method is performed at predetermined time intervals.

12. Method for determining a volumetric flow rate of milk flowing through a milk line during a milking process comprising the steps of:
  a) determining at a first measurement point a cross-sectional area of a cross-section of a milk flow:
  b) measuring a time that the milk flow travels from the first measurement point to a second measurement point, the second measurement point being downstream from the first measurement point:
  c) calculating a flow velocity based on the measured time and a distance between the first and second measurement points:
  d) determining the volumetric flow rate from the cross-sectional area and the flow velocity:
  e) determining a characteristic capacitance quantity of the milk within a predetermined measurement volume; and
  f) comparing the characteristic capacitance quantity of the milk with predetermined capacitance values to determine actual milk volume within the measurement volume and calculating flow velocity based on the characteristic capacitance quantity of the milk and the actual milk volume within the measurement volume.

13. The method according to claim 12, further comprising the steps of:
  measuring at least two milk capacitance values at least two spaced apart locations in the milk line; and
  determining the flow velocity based on a time delay of signals belonging to the capacitance values.

14. The method according to claim 12, further comprising the step of:
  determining the characteristic capacitance at two different frequencies.

15. The method according to claim 12 further comprising the step of:
  determining the characteristic capacitance at two different temperatures.

16. The method according to claim 12, further comprising the step of:
  determining the flow velocity optically.

17. The method according to claim 12 further comprising the step of:

deriving a mass flow rate of the milk flow.

18. Apparatus for determining a volumetric flow rate of milk flowing during a milking process comprising:

a first sensor arranged outside the flowing milk at a first measurement point;

a second sensor arranged outside the flowing milk at a second measurement point downstream of the first measurement point; and an evaluation unit for receiving signals from the sensors, wherein at least one sensor is a first measurement device for determining a capacitance of the flowing milk and the apparatus further comprises:

a second measurement device for determining a flow velocity; and a control unit connected to the evaluation unit and the measurement devices such that the control unit triggers the measurement devices at predetermined time intervals.

19. The apparatus according to claim 18, further comprising:

a third sensor provided downstream from the second measurement point.

20. The apparatus according to claim 18 wherein each sensor is selected from the group consisting of:

a conductivity sensor, a capacitance sensor, an inductance sensor, and a photodetector.

21. The apparatus according to claim 18 wherein the first sensor is a ring electrode.

22. The apparatus according to claim 18, further comprising a line between the sensors, the line formed from an electrically insulating material.

23. The apparatus according to claim 18 wherein the evaluation unit comprises at least one Kalman filter.

24. The apparatus according to claim 18, wherein the first measurement device comprises two plates arranged at a distance from one another for determining the capacitance.

25. The apparatus according to claim 24, wherein the plates are arranged so that the flowing milk at least partially flows over the plates.

26. The apparatus according to claim 25 wherein the plates are parallel to one another.

27. The apparatus according to claim 18 wherein the measurement devices are arranged one after another and the apparatus further comprises:

a correlation unit connected to the measurement devices.

* * * * *